Nov. 30, 1948.                J. H. MOFFAT                2,455,133
                              PARKING DEVICE
Filed Aug. 26, 1944                                     2 Sheets-Sheet 1
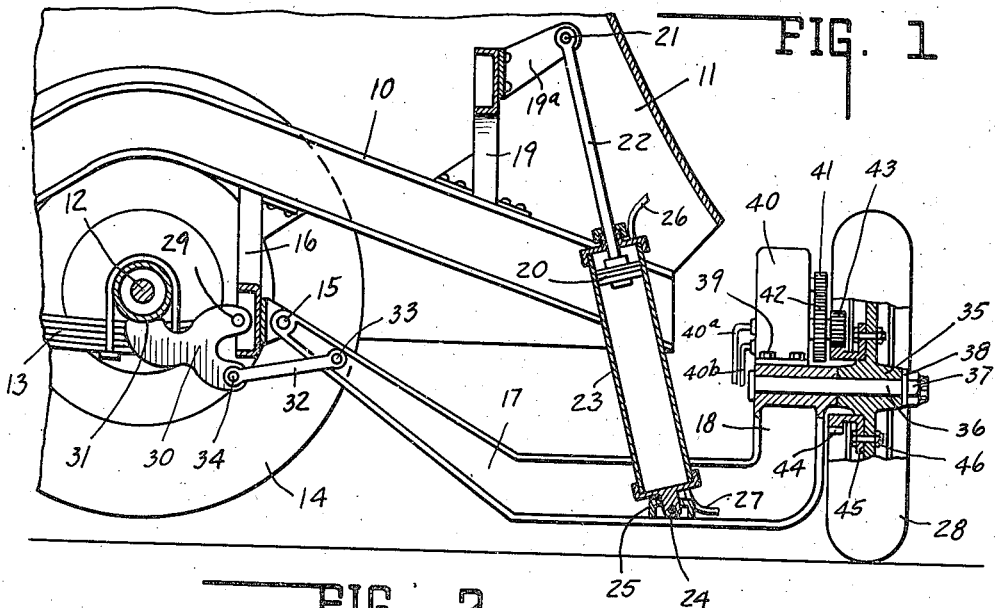
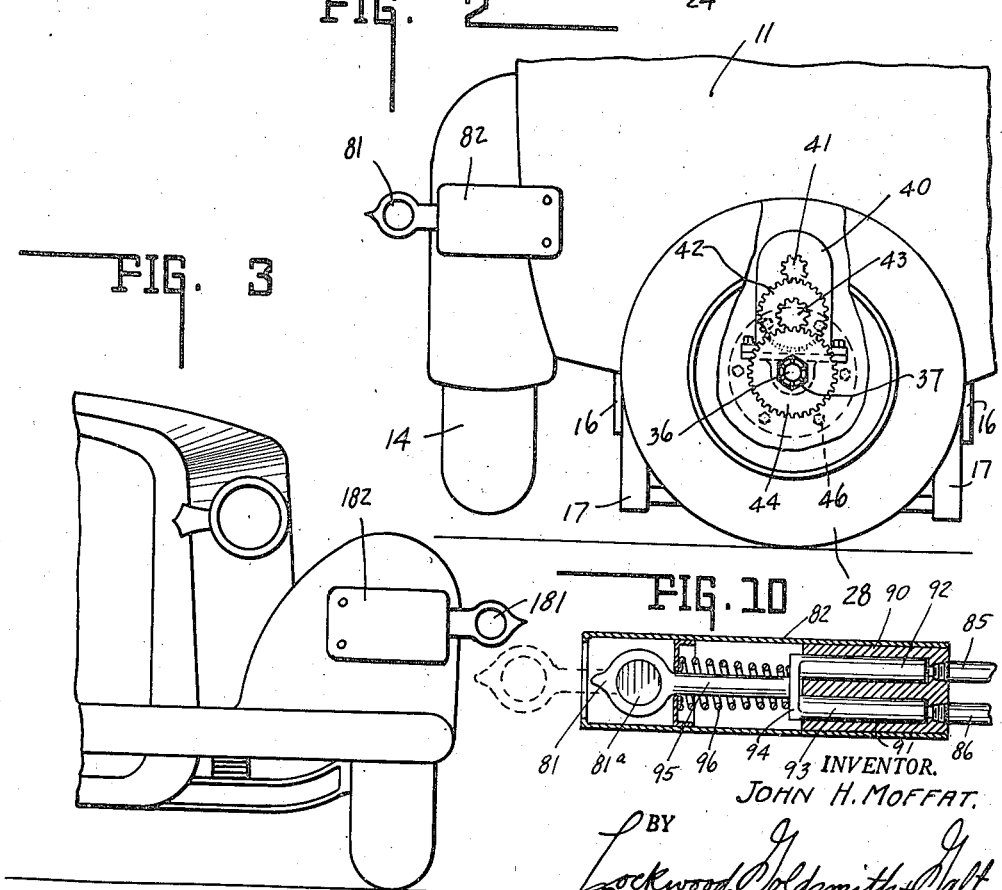
INVENTOR.
JOHN H. MOFFAT.
BY
Lockwood, Goldsmith & Galt
ATTORNEYS.

Nov. 30, 1948.  J. H. MOFFAT  2,455,133
PARKING DEVICE
Filed Aug. 26, 1944  2 Sheets-Sheet 2
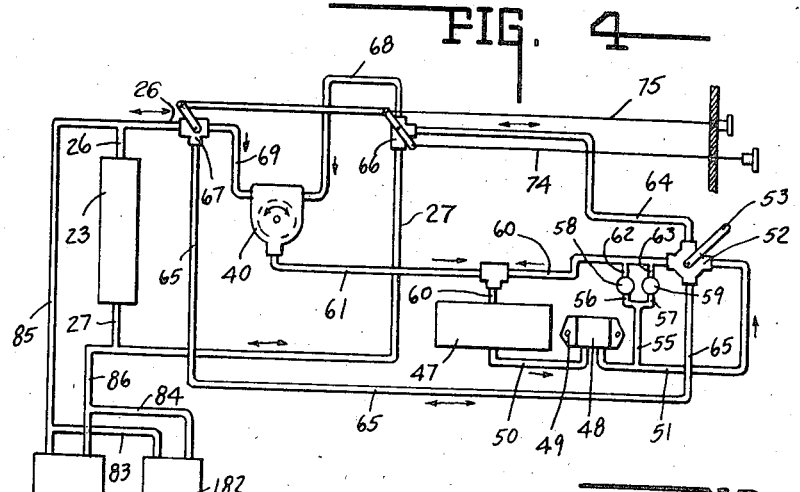
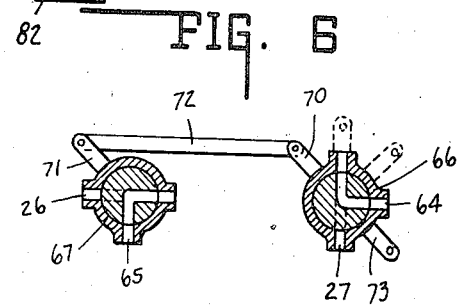
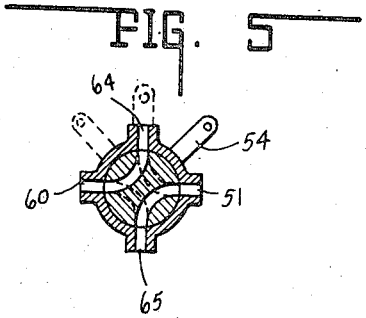
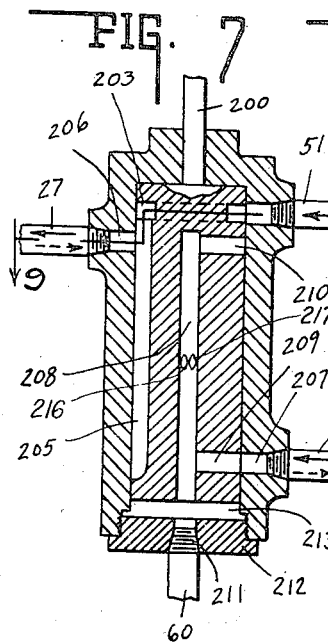
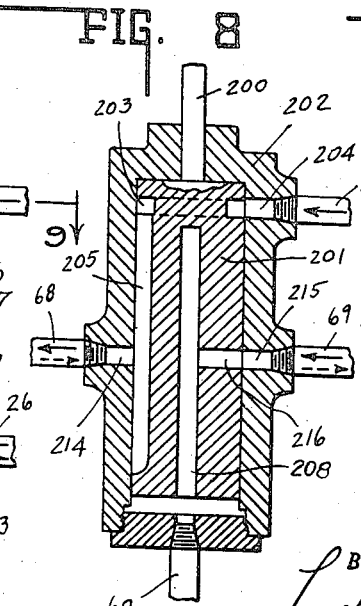
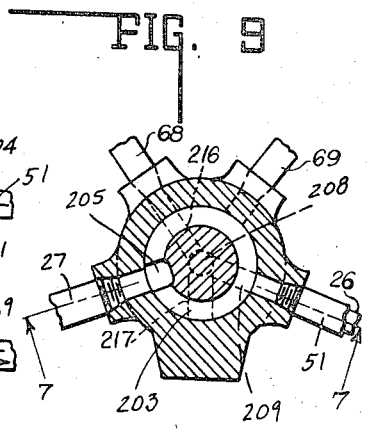
INVENTOR.
JOHN H. MOFFAT.
BY
Lockwood, Goldsmith & Galt.
ATTORNEYS.

Patented Nov. 30, 1948

2,455,133

UNITED STATES PATENT OFFICE 2,455,133

PARKING DEVICE

John H. Moffat, Indianapolis, Ind.

Application August 26, 1944, Serial No. 551,341

3 Claims. (Cl. 180—1)

This invention relates to a parking means for automobiles of the general character represented by Patent No. 2,181,907 dated December 5, 1939.

Since the same discloses fore and aft structures simultanously operable, the disclosure herein will be confined to but one end by way of example only, although same may be duplicated as disclosed in said patent.

The chief object of the present invention is to simplify the construction of the patented structure.

Another object of the invention is to provide semaphore or like warning means simultaneously operable when the device is conditioned for operation.

The chief feature of the present invention resides in the structure provided for the accomplishment of said objects.

Other objects and features of the invention will be set forth more fully hereinafter.

The full nature of the invention will be understood from the accompanying drawings and the following description and claims:

In the drawing Fig. 1 is a longitudinal sectional view of an automobile equipped with the parking means, same being illustrated at the rear end of the vehicle.

Fig. 2 is a rear elevation of same and the rear warning signal.

Fig. 3 is a front elevation of a portion of the vehicle and front warning signal.

Fig. 4 is a diagrammatic representation of the fluid system.

Fig. 5 is a central sectional view of one of the valves illustrated therein.

Fig. 6 is a central sectional view of the dual connected valves having simultaneous operation.

Fig. 7 is a diagrammatic longitudinal section of a vehicle dash mountable valve having selective fluid pressure control and of a modification of the valve system shown in Fig. 4 and is taken on line 7—7 of Fig. 9 in the direction of the arrows.

Fig. 8 is a diagrammatic longitudinal sectional view showing the manually operable core of Fig. 7 in a second position.

Fig. 9 is a cross-sectional view taken on line 9—9 of 7 and in the direction of the arrows.

Fig. 10 is a longitudinal section of the semaphore device.

In Fig. 1 of the drawings 10 indicates the frame of an automobile 11 and provided with axle 12, spring 13 and wheel 14. Pivotally supported at 15 on a U-shaped depending bracket 16 carried by the frame 10 is a U-shaped arm 17 having an upwardly directed central and outer end portion 18.

A U-shaped bracket 19 is carried by the frame 10 and pivotally supported at 21 on extension 19a is the piston rod 22 carrying piston 20 in cylinder 23 pivoted at 24 upon lateral portion 25 of arm 17. Each end of the cylinder includes a combination inlet and outlet 26 and 27.

Whenever a single fluid power unit is utilized, it preferably is centrally positioned. When two such units are employed, they have their combination inlets and outlets connected in parallel and such units are mounted adjacent opposite sides of the frame 10 and the arm 17. Whenever desired, the vehicle body may conceal completely the arm 17 and the traversing wheel 28, or same may be exposed as illustrated in Fig. 1. Preferably wheel 28 is positioned so as to lie between the end of the frame 10 and a bumper structure not shown. When the bumper is utilized, the same may protect said traversing wheel 28 and associated parts. For clearness the bumper illustration is omitted herefrom.

Pivotally supported at 29 on the depending bracket 16, and at each side thereof, is an arm 30 having axle engaging end 31. A link 32 is pivotally connected at 33 to arm 17 and at 34 to said arm 30. Whenever arm 17 is lowered, the arm 30 is elevated so that the spring 13 is retained in loaded relation despite the unloading thereof incident to transfer of the load from wheels 14 to the wheel 28 when the latter is lowered. Hence, wheels 14 are raised with the frame 10 in this operation and the wheels are clear of the road or pavement when the wheel 28 is rotated by moving the vehicle laterally for parking, etc.

All of the foregoing is fully illustrated in the aforesaid patent.

Herein the wheel 28 includes a rotatable support in the form of hub 35 by which the same is supported on trunnion 36 carried by the portion 18 of the arm 17 and retained by nut 37 and washer 38.

Suitably secured at 39 to the portion 18 of arm 17 is a reversible fluid pressure or hydraulic operable motor 40, the power pinion 41 of which meshes with gear 42. Coaxial therewith is the driving pinion 43 which constantly meshes with the driving gear 44 having plate flange 45 offset therefrom and secured to wheel 28 as at 46, see Fig. 1. Motor 40 has combination inlet and exhaust conduits 40a and 40b.

After arm 17 is lowered pressure fluid is supplied to motor 40 to rotate same in the desired direction for desired directional rotation of wheel 28. Hence the vehicle is movable laterally and into and out of a parking space as desired.

Reference will now be had more particularly to Fig. 4 and also to Figs. 5 and 6. In the former 47 indicates a reservoir for oil or like fluid and preferably same is suitably secured to or adjacent the engine of the vehicle so that engine heat will retain the liquid in the desired state of fluidity. Operable continuously by the engine is a pump 48, and same also may be secured as at 49 to said engine.

Conduit 50 connects the reservoir to the pump 48 and line 51 therefrom is the pressure supply line to the master valve 52 having manually operable handle 53. This valve also has arm 54, see Fig. 5, operable therewith. A branch 55 from the supply line 51 is divided as at 56 and 57 and in the former is an adjustable relief valve 58 and in the latter is an open and closed valve 59. The latter is operated from arm 54 such that when handle 53 of valve 52 is neutrally positioned, that is, cuts off or closes line 51, the valve 59 will be open and vice versa. This is to insure fluid cycling without pump locking.

Return conduit 60 from valve 52 to reservoir 47 is connected to both valves 58 and 59 as at 62 and 63 respectively. A return line 61 from the rotary prime mover or motor 40 also connects to the reservoir return line 60. This may be omitted as hereinafter pointed out.

Extending from valve 52 are two conduits 64 and 65 each of which terminates at a dual valve, see Fig. 4. Valve 66 is connected to line 64 while valve 67 is connected to line 65. Valve 66 has connected thereto two conduits 68 and 27 connected respectively to motor 40 and cylinder 23. Valve 67 has connected thereto two conduits 69 and 26 connected respectively to motor 40 and cylinder 23.

Valves 66 and 67 have arms 70 and 71 respectively link connected as at 72 for conjoint operation. Arm 70 is extended as at 73 and connected thereto is a dash mounted rod 74. A similar dash mounted rod 75 is connected to the arm 70. Preferably these are pull rods or are of Bowdin wire type.

When the several valves are positioned as illustrated in Figs. 4, 5 and 6, pressure fluid from pump 48 is supplied by lines 51 and 65 to valve 67 and thence by line 69 to pump 40 for wheel 28 rotation in one direction. The fluid can exhaust by line 61 to reservoir 47.

When rod 75 is "out" and rod 74 is "in," pressure fluid from line 65 is supplied by line 26 to the top of cylinder 23 to raise the traversing wheel 28. Fluid in the opposite end of cylinder 23 exhausts by conduit 27 to valve 66 and from same returns by line 64 to the valve 52 and from thence by line 60 to the reservoir 47. Note the position of valve handle 54 for these two operations is not changed.

When valve handle 54 is moved substantially 90° to dotted line position (Fig. 5), pressure fluid from pump 48, line 51, valve 52 and line 64 is supplied to valve 66. With valves 66 and 67 positioned as illustrated, see Fig. 6, pressure fluid is supplied by line 68 to motor 40 for reverse or opposite rotation of wheel 28 and the motor wastes as before, if desired, by line 61 to the reservoir 47.

When valve 52 is positioned as last mentioned and rod 75 is "pulled out," pressure fluid is supplied to line 27 to lower the wheel 28. Fluid above the piston in the cylinder 23 then exhausts at line 26 and to valve 67 and from it by line 65 to valve 52 which now connects line 65 to the return line 60 and to reservoir 47.

For American practice the sequence is to lower wheel 28 and traverse to the right. Then traverse to the left and finally raise wheel 28. For the English practice the connections may be reversed and the sequence will be to lower wheel 28 and traverse to the left. Then traverse to the right and finally raise wheel 28. Only connections of lines 68 and 69 to motor 40 need be reversed. The foregoing is for conventional parking.

Reference will now be had to Figs. 7 to 9 inclusive wherein a single composite valve, capable of dash mounting, replaces valve 52, 66 and 67 aforesaid and but two lines 40ª and 40ᵇ are required for motor actuation. Looking at Fig. 9, when the valve handle 200 is first turned clockwise approximately 72° from the "off" position, the fluid will be supplied to cylinder 23 for lowering wheel 28. This "off position" is where no fluid is supplied to the system, corresponding to valve 52 being shut off. Herein in Fig. 9 same corresponds thereto when channel 205 is at the bottom of the figure.

Note in said Figs. 7 to 9 that core 201 in chamber 202 and to which stem 200 is secured, includes an annular channel 203 which always registers with port 204 connectible to supply line 51. Extending longitudinally of said core and in the periphery thereof is pressure supply channel 205. When the valve is clockwise moved 72° from the "off" position conduit 27, connected to port 206 then registering with channel 205, is supplied with fluid to lower wheel 28. Fluid in cylinder 23 and above piston 20 is returned by line 26 to port 207.

Core 201 includes the central waste bore 208 provided with transverse passage 209. Hence, when channel 205 registers with port 206, passage 209 registers with bore 208. Note the superimposed passage 210 from bore 208 is now blocked off. Hence, the fluid in line 26 wastes to the reservoir by line 60 herein connected to port 211 in cap 212 closing the end of body portion 202 containing the core. The chamber 213 between cap 212 and the valve member 201 provides a leakage collection chamber always wasting to the reservoir.

When stem 200 is advanced clockwise a second 72°, the channel 205 registers with port 214 connected to line 68 or one supply and exhaust line as 40ª to motor 40 to secure rotation of wheel 28, now lowered and to the right to move the vehicle toward the curb. The motor power fluid returns by line 40ᵇ-69 to port 215. A transverse passage 216 now registers therewith and wastes to bore 208 and thence to line 60 and the reservoir. Travel is stopped as before by moving the valve beyond the described position.

When it is desired to move from the curb, the valve is further turned clockwise a third 72° which now positions a passage 217 similar to passage 216 and displaced 144° therefrom in registry with port 214 and line 68, see Fig. 8, and channel 205 is now registered with port 215. Motor travel accordingly is reversed and rotation of wheel 28 is reversed.

When desired traverse is effected, the valve is moved from said position to a final position wherein channel 205 now registers with port 207 to apply fluid pressure to line 26 and the top of cylinder 23 to raise wheel 28. Fluid in cylinder 23 below piston 20 now returns by line 27 to port 206 and passes by passage 210, then registering therewith, to bore 208 for return to the reservoir.

When wheel 28 is fully raised, the valve member is returned to the original or "off" position and normal vehicle usage is effected. From the foregoing, it will be noted that the motor 40 has but two lines 68 and 69 or 40ᵃ and 40ᵇ respectively and the flow of the pressure fluid determines the motor rotation direction. Hence, line 61 may be omitted. The foregoing valve accordingly is a singular simplification of the three valves illustrated in Figs. 5 and 6. Whenever front and rear units are incorporated, same are conduit coupled in multiple as illustrated in the aforesaid patent.

As illustrated in Fig. 2, a semaphore arm 81 is projected from a housing 82. In Fig. 3 a semaphore arm 181 is projected from a housing 182. As illustrated in Fig. 4, housings 82 and 182 are connected in multiple by pressure lines 83 and 84 and same are connected by lines 85 and 86 to lines 26 and 27 respectively.

Thus, whenever pressure fluid is supplied to either end of cylinder 23, pressure fluid is selectively supplied to the semaphore housing for extending or exposing same for warning purposes.

Referring to Fig. 10 casing 82 contains two cylinders 90 and 91 in which are mounted pistons 92 and 93 respectively. These are rigidly connected together as at 94 and portion 95 accordingly is reciprocable. A spring 96 normally constrains the portion 95 in retracted position. Rigid with stem 95 is semaphore arm 81.

Whenever pressure fluid is supplied to either end of cylinder 23, pressure fluid is supplied to one of the two cylinders 90—91 to move the piston therein in opposition to spring 96 and thus actuate or expose the semaphore arm 81. When the pressure is released, the spring 96 returns said arm to its retracted position. As stated, pressure to either cylinder 90 or 91 secures warning operation.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. In a vehicle parking mechanism comprising a laterally movable wheel capable of elevation and lowering, the combination of a single source of fluid pressure, fluid pressure operable reciprocable means for raising and lowering the wheel, fluid pressure operable means for reversely rotating the wheel, valve means selectively connecting both of said means to said source and controlling said means and comprising a body and a single rotatable control member therein, the pressure source supply being connected to the valve means body at all times, a single waste connected to the valve means body at all times, a pair of substantially parallel passageways in the member, each passageway having a closed end, and oppositely directed, and each continuously connected at the opposite end to the supply and waste respectively, and lateral passageways in the member and body adapted for selective communication with the supply and waste and connected to the fluid pressure operable means, one of the parallel passageways being centrally disposed in the member, and an arcuate passageway peripherally disposed immediately beyond the closed end of said one passageway and connected to the other passageway remote from the closed end thereof.

2. Mechanism as defined by claim 1 wherein there is provided a reservoir to which the waste is always connected and a single connection is constantly provided between said reservoir and said source of fluid pressure for closed cycle operation, the reservoir being essentially of non-pressure type.

3. Mechanism as defined by claim 2 where the source of pressure supply is additionally connected through a pressure relief device to said reservoir.

JOHN H. MOFFAT.

REFERENCES CITED

The following references are of record in the file of this patent:

UNITED STATES PATENTS

| Number | Name | Date |
| --- | --- | --- |
| 1,609,044 | Williams | Nov. 30, 1926 |
| 1,692,578 | Rystedt | Nov. 20, 1928 |
| 1,951,145 | Girl et al. | Mar. 13, 1934 |
| 2,181,907 | Moffat et al. | Dec. 5, 1939 |